UNITED STATES PATENT OFFICE.

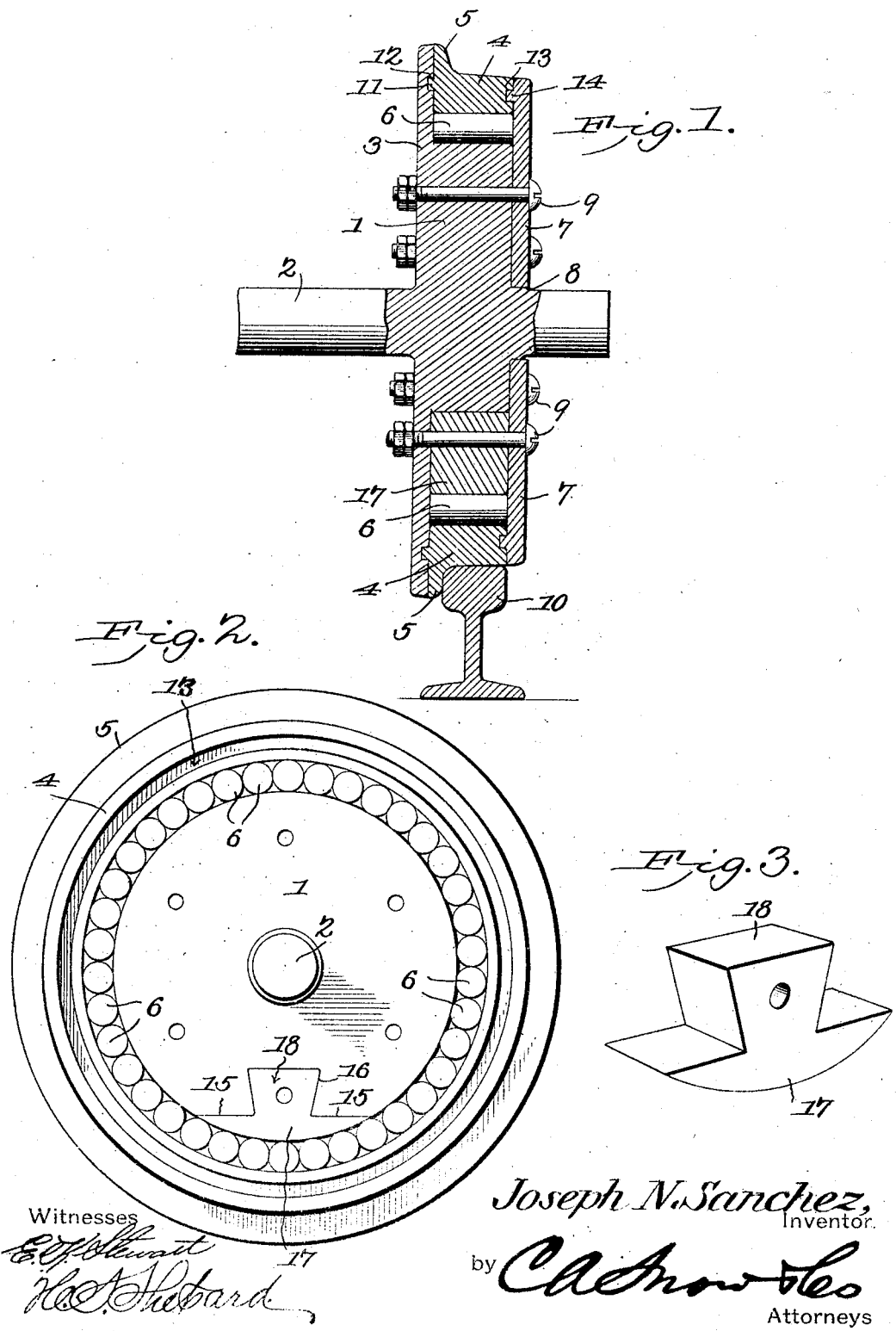

JOSEPH N. SANCHEZ, OF GALVESTON, TEXAS.

ROLLER-BEARING WHEEL.

No. 796,456. Specification of Letters Patent. Patented Aug. 8, 1905.

Application filed March 1, 1905. Serial No. 247,937.

*To all whom it may concern:*

Be it known that I, JOSEPH N. SANCHEZ, a citizen of the United States, residing at Galveston, in the county of Galveston and State of Texas, have invented a new and useful Roller-Bearing Wheel, of which the following is a specification.

This invention relates to wheels, and in particular to car-wheels, and has for its object to provide an improved antifriction-bearing for such type of wheels wherein wear is reduced to the minimum and the part subject to wear may be conveniently replaced.

The invention consists in the combination and arrangements of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a cross-sectional view of a wheel embodying the features of the present invention. Fig. 2 is an elevation of the wheel with the face-plate removed therefrom. Fig. 3 is a detail perspective view of the removable segment.

Like characters of reference designate corresponding parts in each and every figure of the drawings.

Under the present invention it is proposed to have the body of the wheel fixed upon a non-rotatable axle and to equip the body of the wheel with a rotatable tread or rim portion mounted to run concentrically upon the body and to interpose antifriction devices between the body and the tread of the wheel, so as to insure a smooth and steady running of the wheel.

As embodied in the accompanying drawings, the present form of wheel includes a solid cylindrical body 1, which is cast or otherwise fixed upon an axle 2, projected at opposite ends of the body. This body is provided at its inner end with an annular disk-shaped flange 3, flush with the inner end of the wheel and projected at a predetermined distance beyond the periphery of the body portion 1. A ring or cylindrical shell 4 of greater diameter than the diameter of the body portion 1 is fitted concentrically upon the latter and against the flange 3, there being an annular space between the body 1 and the ring 4. The outer periphery of the ring 4 has a diameter somewhat less than the diameter of the flange 3 and is designed to form the tread of the wheel, said ring being provided at its inner end with an external annular flange or rim 5 of the same diameter as the flange 3, so as to be flush with the periphery thereof, the two flanges constituting the rim of the wheel and the flange 3 constituting a brace or backing for the comparatively thin ring portion 5. A series of antifriction devices, such as rollers 6, is interposed between the body 1 of the wheel and the rim 4, and a face-plate 7, having a central opening 8, is fitted upon the outer end of the axle 2 and flat against the outer ends of the body 1 and the rim 4, there being threaded fastenings 9 piercing the face-plate 7 and entering the body of the wheel to detachably connect the former to the latter, and thereby retain the rim 4 and the antifriction-roller in place between the flange 3 and the plate 7. It will of course be understood that the outer end of the body portion 1 projects slightly beyond the outer ends of the antifriction-rollers and the outer end of the rim 4 in order that there may be sufficient room for the ring 4 to rotate uninterruptedly concentrically upon the body portion 1 and to permit of the uninterrupted rotation of the individual antifriction-rollers. The face-plate 7 is slightly less in diameter than the external diameter of the ring or tread member 4 in order that there may be no possibility of the fixed plate 7 dragging upon the railway-track, as will be clearly understood by reference to Fig. 1 of the drawings, wherein 10 designates an ordinary rail with the wheel of the present invention supported thereon in the ordinary manner of a car-wheel.

In view of the fact that the members 3 and 7 are fixed or non-rotatable and the member 4 is rotatable between these members foreign matter is liable to work through the joints between the members 3, 4, and 7 and into the bearing of the rotatable member 4 upon the fixed member 1. To overcome this objection, the ring 4 is provided upon its inner face with an annular rib 11, working in a corresponding annular groove 12 in the inner face of the flange 3, while the other end of the ring is provided with an annular groove 13, in which is received an annular rib 14 upon the inner face of the plate 7, whereby the joints between the members 3, 4, and 7 are interrupted and the ingress of foreign matter is prevented.

It will here be explained that the weight of the car-truck of course comes upon the axle 2, and in turn the weight and the consequent wear thereof comes upon the lower peripheral portion of the body 1, wherefore it is proposed to have this lower peripheral portion replaceable in the following manner: The lower peripheral edge portion of the body 1 is cut away or rendered flat, as at 15, and midway of the ends of this flattened portion there is a dovetailed recess or seat 16. To fill out the complete periphery of the wheel, there is a removable segment 17, corresponding identically to the part removed from the body, and this part is provided with a dovetailed projection or key 18 upon its flat side to snugly and removably fit within the dovetailed seat 16, so as to prevent creeping of the segment 17 when the latter is fitted in place and the face-plate 7 is secured to the body. When the convexed edge of the segment becomes worn, the axle is jacked up, the face-plate 7 removed, and the worn segment replaced by a new segment, after which the face-plate is replaced and the wheel let down upon the rail, whereby the worn portion is replaced in a very simple and convenient manner.

From the foregoing description it will be understood that the wheel of the present invention is exceedingly simple, durable, and inexpensive, and the parts thereof may be assembled in a very convenient manner. Moreover, the removable parts 4, 6, 7, and 17 may be readily replaced when worn or damaged, whereby the wheel may be conveniently and inexpensively maintained in a proper working condition.

While the axle 2 has been shown projected at the outer side of the wheel in order that this projected portion may fit in the usual journal-box, and thereby obviate changes in the manner of connecting the axle and the car-truck, it is of course apparent that the projected axle portion may be dispensed with and the intermediate portion of the axle connected to the car-truck in any approved manner without affecting the spirit of the present invention.

A very important feature of the present invention resides in the fact that I am enabled to employ graphite or other powdered or granular lubricant for the antifriction-rollers and the bearing peripheral faces of the wheel-body and the tread-ring, thereby obviating the inconvenience of frequently supplying the bearing with oil, as in ordinary bearings for car-wheels, for the reason that graphite does not work out of the bearing and become evaporated to the same extent as lubricating-oil.

Having thus described the invention, what is claimed is—

1. A wheel comprising a cylindrical body having a peripheral flange at one end, a tread-ring rotatably embracing the body, and a face-plate secured to the other end of the body and lapping the adjacent end of the ring to rotatably hold the latter upon the body between the flange thereof and the plate, there being annular tongue-and-groove joints between the flange, the ring and the face-plate.

2. A wheel comprising a cylindrical body having a peripheral flange at one end, a tread-ring rotatably encircling the body and provided at its inner end with an external annular rim working against the flange and of equal diameter therewith, and a face-plate secured to the other end of the body and lapping the adjacent end of the ring to rotatably retain the latter between the flange and the plate.

3. A wheel comprising a cylindrical body, a rotatable tread-ring encircling and working upon the body, and a replaceable segmental peripheral portion for the body at the point of wear thereon.

4. The combination of an internal cylindrical member and an external ring member loosely embracing the periphery of the cylindrical member, one of the members being rotatable and the other non-rotatable, and one of the members having a replaceable peripheral portion at the point of wear thereon.

5. The combination of an internal cylindrical member and an external ring member loosely encircling the cylindrical member, one of these members being non-rotatable and the other rotatable, and one of the members having a replaceable peripheral portion provided with a dovetailed key-and-socket connection therewith, the replaceable portion being located at the point of wear.

6. A wheel comprising a cylindrical body having a replaceable peripheral portion at the bottom thereof, and a tread-ring encircling the body and rotatable thereon.

7. The combination with a stationary axle, of a cylindrical wheel-body fixed thereon and provided at one end with an external annular flange projected beyond the periphery of the body, a tread-ring rotatably encircling the periphery of the body and provided at its inner end with an external annular rim working against the flange of the body and corresponding in diameter thereto, and a face-plate detachably secured to the other end of the body and lapping the adjacent end of the ring, there being annular tongue-and-groove joints between the flange of the wheel, the ring and the face-plate, the bottom peripheral edge of the wheel-body having a replaceable segmental portion provided with a dovetailed key-and-socket detachable connection with the body.

In testimony that I claim the foregoing as my own I have hereto affixed my signature in the presence of two witnesses.

JOSEPH N. SANCHEZ.

Witnesses:
J. H. JOCHUM, Jr.,
J. ROSS COLHOUN.